United States Patent [19]
Arbter

[11] Patent Number: 4,677,568
[45] Date of Patent: Jun. 30, 1987

[54] PROCESS AND SYSTEM FOR PROGRAMMING ROBOT MOVEMENTS

[75] Inventor: Klaus Arbter, Moorenweis, Fed. Rep. of Germany

[73] Assignee: Deutsche Forschungs- und Versuchsanstalt fur Luft- und Raumfahrt e.V., Cologne, Fed. Rep. of Germany

[21] Appl. No.: 731,831

[22] Filed: May 8, 1985

[30] Foreign Application Priority Data

May 14, 1984 [DE] Fed. Rep. of Germany ....... 3417868

[51] Int. Cl.$^4$ .................... G06F 15/46; G05B 19/42
[52] U.S. Cl. .................................. 364/513; 318/568; 364/193; 901/3
[58] Field of Search ................ 364/513, 478, 191–193, 364/167–171; 318/568; 901/2–5; 414/730

[56] References Cited

U.S. PATENT DOCUMENTS

| | | | |
|---|---|---|---|
| 3,920,972 | 11/1975 | Corwin, Jr. et al. | 364/513 |
| 4,156,835 | 5/1979 | Whitney et al. | 364/513 X |
| 4,380,696 | 4/1983 | Masaki | 364/513 X |
| 4,462,046 | 7/1984 | Spight | 364/822 X |
| 4,495,588 | 1/1985 | Nio et al. | 364/513 |
| 4,517,653 | 5/1985 | Tsuchihashi | 364/513 |
| 4,523,287 | 6/1985 | Kogawa | 364/513 |

*Primary Examiner*—Joseph Ruggiero
*Attorney, Agent, or Firm*—Collard, Roe & Galgano

[57] ABSTRACT

There is provided a process and system for the memory-saving programming of the motional actions of a robot wherein a reference course is recorded first in the form of samples, which are then stored. For reducing the storage space, the recorded and stored samples are transformed into a Fourier matrix $_0\underline{C}$ by means of a Fourier analysis. Said matrix is then filed in a memory. From this Fourier matrix $_0\underline{C}$, it is possible to derive Fourier matrices for courses with the same configuration, but with any desired position and orientation solely by a linear transformation of the coordinates in the form of a Fourier matrix $_1\underline{C}$. With the help of the dynamical model of the robot used, the derived Fourier matrix $_1\underline{C}$ can be modified with adjustment to the desired speed, so as to compensate for the dynamical errors in the motional actions of the robot. For creating the course coordinates which the robot can then follow when performing its movements, the modified Fourier matrix $\underline{C}$ is subjected to a final Fourier synthesis with predetermination of an arc length (s) conforming to the desired course speed (v). In this way, not only is memory-saving programming achieved, but the dynamics of the robot can be compensated for within the spectral range irrespective of speed if the dynamics of the robot used can be represented by a transmission function.

2 Claims, 4 Drawing Figures

PROCESS AND SYSTEM FOR PROGRAMMING ROBOT MOVEMENTS

The present invention relates generally to a process and system for programming robot movements and, more particularly, it relates to a process and system for the memory-saving programming of the motional actions of a robot and for compensating for dynamic errors in such motional actions while such actions are being performed by the robot.

Various methods are known for recording the N-degree-of-freedom movements of a robot. For examle, samples can be recorded that are equidistant with respect to time or location. Or the movement of the robot may be approximated by a polygonal course and (non-equidistant) corner points recorded. With another known technique, the movement of the robot is approximated by circle segments and the initial point, the end point and an intermediate point are simultaneously recorded per segment. The actual execution of the movement of the robot then takes place either by direct utilization of the recorded values or by an interpolation between said values along straight lines or circles.

These known recording methods, however, lead to good exploitation of the memory only in those cases where the desired course can be described with sufficient accuracy by relatively long straight-ine sections or arcs. Such a description of a course, however, is not possible with smooth courses with a changing curvature. In such a case, samples must be recorded and registered with a close sequence, i.e., said values must be close to each other, in order to keep the approximation error small. So-called dynamical errors of motion (elasticity) occur with rapid passage through a preset course. One possibility for compensating for dynamical errors of motion is to measure said errors and to derive from the measured results correction signals. Such correction signals, however, are then valid only for the given course and for the course speed at which they were determined, i.e., new correction signals must be determined and registered for each task.

It is, therefore, the object of the present invention to provide a method and system for the memory-saving programming of robot movements and for compensating for dynamical errors of motion while the movements of the robot are being performed. In the case of smooth, curved courses, such a method must provide for a data reduction for the registration or recording of such smooth, curved courses, and subsequently in the simplest possible way for a compensation of the dynamical errors of motion with no dependence on the task and with adjustment for speed.

This object is accomplished in accordance with the present invention by providing a process and system wherein a reference course is recorded first in the form of samples, which are then stored. For reducing the memory space, the recorded and stored samples are transformed into a Fourier matrix $_0\underline{C}$ by means of a Fourier (frequency) analysis, this matrix is then filled in a memory. Fourier matrices may then be derived from this Fourier matrix $_0\underline{C}$ for courses having the same configuration, but any desired position and orientation, solely by linear transformation of the coordinates in the form of a Fourier matrix $_1\underline{C}$. With the help of the dynamical model of the robot used, the derived Fourier matrix $_1\underline{C}$ can then be modified (to a matrix $\underline{C}$) with adjustment to the desired speed, thus compensating for the dynamical errors of motion of the robot. For the purpose of creating course coordinates, which the robot then can follow when performing its movements, the modified Fourier matrix $\underline{C}$ is then subjected to a final Fourier synthesis with predetermination of an arc length "s" conforming to the desired course speed "v".

Thus, according to the present invention, courses or trajectories that are to be reproduced by the movements of the robot are represented by matrices whose elements are Fourier coefficients of continuous functions with a limited derivative. In this way, the data stock is, in general, drastically reduced as compared to the conventional representation by equidistant samples. The required storage capacity is only dependent upon the course of the path or trajectory and on the admissible or admitted mean sequare error of the synthesis; however, the difference between the prior art and the present invention is that in the present case, the storage expenditure is not dependent on the selected recording method. For trajectories that can be converted into each other by a linear transformation, the Fourier matrix, according to the present invention, need be calculated only once and then stored in a memory for reference courses. When needed, the linear transformation then may be carried out via the Fourier coefficient. If the dynamics of the robot used can be represented by a transmission function, a speed-dependent compensation of the dynamics of the robot within the spectral range is possible, whereby the speed of the movement through the course or trajectory is (quasi) continuously variable.

Other objects and features of the present invention will become apparent from the following detailed description considered in connection with the accompanying drawings. It is to be understood, however, that the drawings are designed as an illustration only and not as a definition of the limits of the invention.

In the drawings similar reference characters denote similar elements throughout the several views.

First, the principle of the method of the invention will be explained. The quantities that define or establish a movement of the robot (e.g. Cartesian coordinates, joint angle, etc.) are summarized to form an N-dimensional vector:

$$x = (x_1, x_2, \ldots, x_N)^T \quad (1)$$

The raised "T" designates the transposed vector.

A "course" or a "trajectory" is the set of all x's which a robot assumes in the course of a working movement. If the robot operates repetitiously, its trajectory is "closed" (in the following, it is basically assumed that the trajectory is "closed", which is possible without limiting the generality because open trajectories can always be supplemented to closed ones without later passage through the piece added to close a trajectory).

Figure 1:
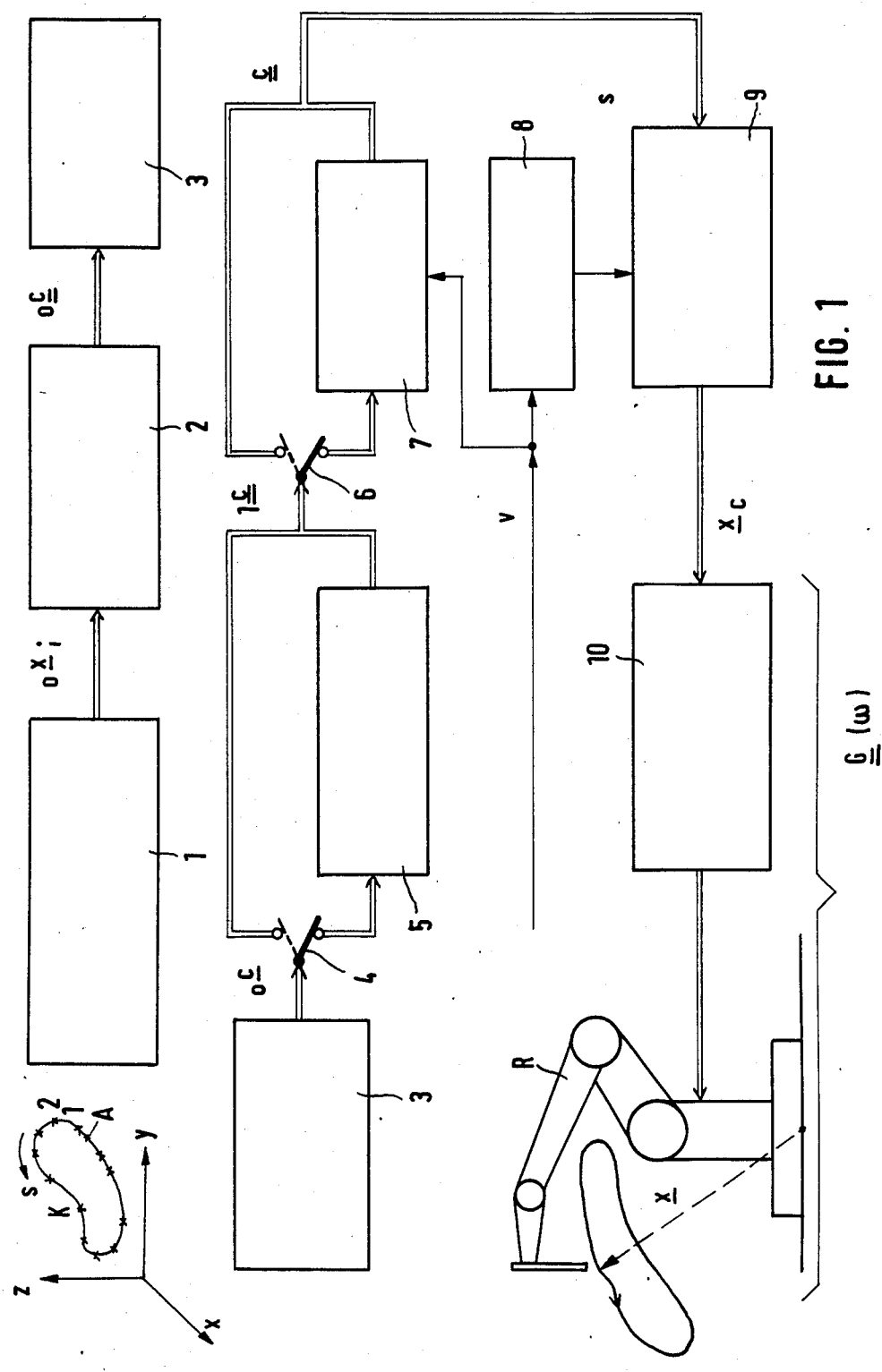
FIG. 1 is a schematic block diagram of a system for carrying out the process according to the present invention.

The trajectory starts and ends in the so-called "space point" A (see FIG. 1).

While the robot is passing through a trajectory, it is covering within the N-dimensional vector space a "distance" s(t), to which the following applies:

$$s(t) = \int_0^t v(\tau)d\tau \qquad (2)$$

where "v" is the "speed" along the trajectory (if the speed "v" is negative, this only means that the robot passes through the trajectory "in reverse"). The following, then, applies to a differential path increment:

$$ds = \sqrt{dx_1^2 + dx_2^2 + \ldots + dx_n^2}. \qquad (3)$$

The path or distance covered by one full rotation is referred to as the "length" L of the trajectory or course, which is perceived of as a vectorial function of the scalar quantity "s", said function being periodic with respect to the length "L". For the trajectory $$\underline{x}(s)=(x_1(s), x_2(s), \ldots x_n(s))^T; \; 0 \leq s \leq L \qquad (4)$$

the following applies on condition that $$\underline{x}^T(s+iL)=\underline{x}^T(s) \text{ for } i=0, \pm 1, \pm 2, \ldots \qquad (5)$$

In this way, each distance s(t) is clearly associated with a point on the trajectory and the coordination of the components of $\underline{x}$ is solved implicitly irrespective of the speed. Furthermore, this parametrization causes the components to be real, periodically continuous functions of the distance "s" with limited derivative with respect to distance "s".

Such functions can be approximated with any desired accuracy by rapidly converging Fourier series. In particular, this applies to "smooth" curved courses or trajectories because the rate of convergence of the Fourier series increases with the increase in the number of disappearing derivatives of the original function. The Fourier series $\hat{x}_n(s)$ of the $n^{th}$-component, which is discontinued after the $M^{th}$-member, reads as follows:

$$_1\hat{x}(s) = c_{n,0} + 2Re\left\{ \sum_{m=1}^M c_{n,m} e^{j2\pi ms/L} \right\} \qquad (6)$$

The Fourier series $\hat{x}_n(s)$ has the complex Fourier coefficients $c_{n,m}$, which read as follows:

$$c_{n,m} = \frac{1}{L} \int_0^L x_n(s) e^{-j2\pi ms/L} ds \qquad (7)$$

wherein n=0, 1, ... N and m=0, 1, 2, ..., M. The matrix formed by such complex Fourier coefficients $c_{n,m}$ is called the "Fourier matrix", which can be represented as follows:

$$\underline{\underline{C}} = (c_{n,m}) \text{ with } n=1, \ldots, N \; m=1, \ldots, M \qquad (8)$$

Such as Fourier matrix clearly represents the course or trajectory in a reversible way except for the approximation error, which, in terms of the mean square error, is minimal. Said error is reflected mainly by a "rounding off" of corners; however, this is an effect that is rarely disturbing, but rather frequently desired because this has a conserving effect, for example on the drive of the robot. (See, for example, FIG. 2).

The Fourier coefficients for each trajectory are independent of the recording method. The required number of Fourier coefficients is dependent only on the course of the trajectory and the admissible mean square error of the synthesis. If, however, a course or trajectory is represented by samples, as it is in the case of methods previously known, their density is often dependent on the desired course or development of the speed. Apart from special cases such as, for example, a complete circular course, where two coefficients per component suffice, the storage requirement for Fourier coefficients is about comparable to the one that would be required for storing optimal samples in terms of a square error criterion.

The consequence of the above for practical applications is that no preprocessing for data reduction is required, on the one hand, whereas on the other hand, however, an augmentation of the data within the original scope, if it serves the purpose of "smoothing" (for example a spline interpolation), enhances the convergence behavior of the Fourier series, thereby reducing the storage space required for the Fourier coefficients.

The class of all trajectories $\underline{x}(s)$ capable of being transformed into each other by a linear mapping can be represented by the Fourier matrix $_0\underline{\underline{C}}$ of one single reference course $_0\underline{x}(s)$, because with $$_1\underline{x}(s) = \underline{\underline{A}} \cdot _0\underline{x}(s) + b \qquad (9)$$

the following applies:

$$_1\underline{\underline{C}} = \underline{\underline{A}}_0\underline{\underline{C}} + [b, 0, \ldots, 0] \qquad (10)$$

where $\underline{\underline{A}}$ is a matrix describing the change of orientation, and b is a displacement vector.

For a particular application, the consequence of this is that in a "library of trajectories", for example in the form of a reference course memory, only the scope of the memory is required for the representative ($_0\underline{\underline{C}}$). However, the linear reproduction itself can be carried out with the help of a reduced data record prior to the synthesis, which takes place off-line (see FIG. 1).

Now, the dynamics of the robot are to be described (approximately) by the complex transmission functions $g_{i,j}(\omega)$ of cyclic frequency $\omega$, which, in general, is referred to as the dynamic model of the robot. The indices i, j mean that the transmission function describes the effect or action on the "i"-component of the vector of the trajectory when excited by the "j"-component of the vector. The matrix $$\underline{\underline{G}}(\omega) = (g_{i,j}(\omega)) \qquad (11)$$

in which the transmission functions are summarized for the instantaneous work point or work range, is called the "transmission matrix". Assuming that the speed "v" along the trajectory is constant and with $$\omega_m = m2\pi f_0, \; f_0 = 1/T \text{ und } T=L/v \qquad (12)$$

we obtain an indicated matrix sequence:

$$\underline{\underline{G}}_m = \underline{\underline{G}}(m2\pi v/L) \qquad (13)$$

A matrix sequence $\underline{\underline{G}}_m^+$: m=0, 1, ... M is referred to as the "compensator" if it satisfies the following condition:

$$\underline{\underline{G}}_m^+ \underline{\underline{G}}_m = \underline{\underline{1}} \text{ for } m=0, 1, \ldots, M \tag{14}$$

The dynamics of the robot are compensated (within the scope of validity of the dynamical model) with dependence on the speed by multiplication of the $m^{th}$-compensator matrix $\underline{\underline{G}}_m^+$ with the $m^{th}$-column of the Fourier matrix of the nominal trajectory $_1\underline{C}_m$. Then, the following applies to the columns of the Fourier matrix $\underline{\underline{C}}$ of the compensated trajectory $\underline{x}_c(s)$:

$$\underline{c}_m = \underline{\underline{G}}_m^+ {}_1\underline{c}_m \text{ for } m=0, 1, \ldots, M \tag{15}$$

The trajectory $\underline{x}(t_k)$, which is compensated by dynamical errors of motion, at the discrete points of time or moments $t_k$ follows from the Fourier synthesis with $s=s_k$, where $s_k$ is determined by integration in accordance with the desired course of the speed (cf. equation (2)). A trajectory can be started at any desired point by suitable selection of an initial value $s_0$ or of the space point "A". In order to come up with a uniform representation of the dynamics irrespective of the design features of the robot used, the calculation of the control signal (for example control increments) is perceived of as a component of the dynamical model of the robot.

The following describes the operational sequence of the process of the present invention, explained with the help of the block diagram shown in FIG. 1. A three dimensional reference course is shown in the left top corner of FIG. 1. The three dimensional space is indicated by the x, y and z axes. Furthermore, the aforementioned space point "A" is plotted on the reference course, as well as various samples $x_k$, whereby K=0, 1, 2, ... up to K−1. In addition, the distance "s" to be covered is indicated by an arrow. With the method according to the invention, the samples $\underline{x}_k$ are recorded first by one of the conventional methods and stored in a memory 1. Subsequently, the stored samples $\underline{x}_k$ are subjected to an analysis analogous to the above equation (7) in a Fourier transformer 2. The result of said analysis is the Fourier matrix $_0\underline{\underline{C}}$, which is stated in a general form in equation (8), and said matrix is then filed in a reference course memory 3.

Now, if a robot "R", as schematically shown in the left bottom corner of FIG. 1, is to follow a course with a configuration conforming to the course stored in reference course memory 3, but with a position and orientation deviating from the position and orientation of the reference course, a Fourier matrix $_1\underline{\underline{C}}$ is derived from the filed Fourier matrix $_0\underline{\underline{C}}$ by linear transformation of the coordinates in a coordinate transformer 5 in accordance with equation (10). Subsequently, the Fourier matrix $_1\underline{\underline{C}}$ so obtained by linear coordinate transformation is modified in a dynamics compensator 7 by means of the robot-specific dynamical model $\underline{\underline{G}}(\omega)$ (in accordance with equation (11)), whereby an adjustment to the desired course speed "v" is simultaneously executed in the dynamics compensator 7. In this way, a modified Fourier matrix $\underline{\underline{C}}$ is obtained on the output side of the compensator 7. If the Fourier matrix $_0\underline{\underline{C}}$ stored in the reference course memory 3 has to be subjected to both a linear transformation of the coordinates in the coordinate transformer 5 and a modification by the dynamical model of the robot in the dynamics compensator 7 in order to obtain the modified matrix $\underline{\underline{C}}$, the data are processed via the switches 4 and 6 (shown schematically in FIG. 1), which, then are in the positions shown by the solid lines. The data are processed via the other, i.e., dashed, positions of the switches 4 and 6 only if the coordinate transformer 5 and/or the dynamics compensator 7 can be by-passed, i.e., if the robot is expected to directly follow the reference course stored in the reference course memory 3.

The modified Fourier matrix C obtained on the output side of the compensator 7 is subsequently subjected to a Fourier synthesis in a Fourier transformer 9 in accordance with the equation (6), with predetermination of the arc length "s", which is obtained by integration is an integrator 8 from the course speed "v". The course commands $\underline{x}_c$ derived at the output of the Fourier transformer 9 are delivered to a computer 10 for actuating the variables, said computer being associated with the robot "R". In said computer 10, the course commands $\underline{x}_c$ are then converted into the join commands to be processed by the robot "R". The free arm of the robot "R" then travels through a course conforming in its configuration to the reference course. However, the position and orientation of the course followed by the robot may differ from the position and orientation of the reference course.

Figure 2:
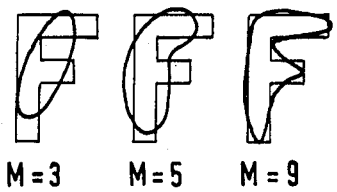
FIG. 2 is an example of an application of the process according to the present invention for the Fourier-synthesis of the letter "F"
Figure 2:
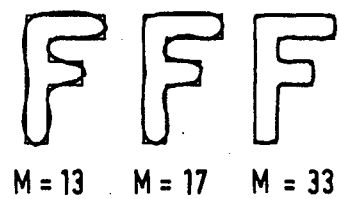

An application of the process is described in the following by way of example with the help of FIG. 2. Said example of the process of the invention shows how a continually enhanced or closer approach to the nominal trajectory in the form of the letter "F" can be achieved by increasing the number of the required Fourier coefficients by the Fourier synthesis. As stated earlier, the nominal trajectory is to be a flat or plane course having the shape of a capital letter "F". Said trajectory has sharp corners and, within the original scope, may be plotted with exactness and a minimum amount of storage expenditure by the coordinate values of the ten corner points. The practical execution of this example of application demonstrates in a clear way the convergence behavior of the Fourier series and the property of "rounding off" the corners. In FIG. 2, "M" represents the number of coefficients used in the Fourier synthesis, where the number "M" of coefficients ranges from M=3 M=33.

The application example shown in FIG. 2 demonstrates, furthermore, that the number of coefficients required for the representation, with the present type of course, is higher than the minimum number (of ten) of samples in the original scope. However, if the course in the shape of the letter "F" were represented by equidistant samples, in which case the scanning interval is preset on account of the fact or requirement that the scanning error on the corners of the letter "F" must not exceed the synthesis error, more samples than Fourier coefficients would be required for such representation.

Figure 3A:
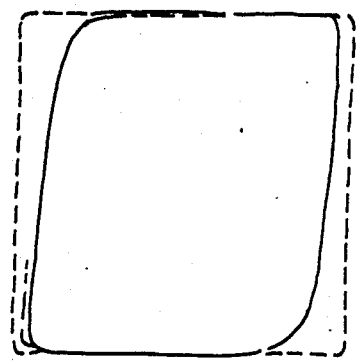
FIG. 3(a) illustrates an execution of the method according to the present invention without the use of a simple compensator for an ASEA-robot (IRb6)
Figure 3B:
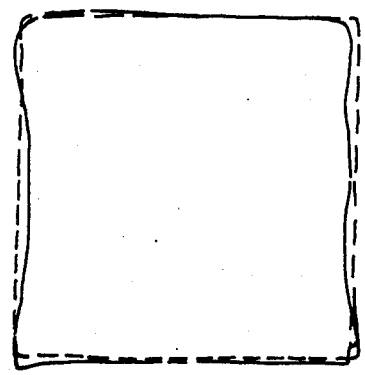
FIG. 3(b) illustrates an execution of the method according to the present invention with the use of a simple compensator for an ASEA-robot (IRb6).

In FIG. 3(a) and FIG. 3(b), the nominal course is a flat or plain track in the form of a square. FIG. 3(b) demonstrates the effect of the use of a simple compensator. The course was executed with the use of an ASEA-robot of type IRb6. In FIG. 3(a), and FIG. 3(b), the predetermined nominal course is shown by the dashed line. The drawn line in FIGS. 3(a) and 3(b) represents the actual course at a course speed of 0.27 m/s, whereby the course in FIG. 3(a) was executed without compensation and the course in FIG. 3(b) was executed with compensation.

During the execution of the test, it was found that the dynamics of the ASEA-robot IRb6 can be approximately described for two axial directions (x and y) extending perpendicular to each other by uncoupled dips of the first order. The dynamical model of the robot was assumed to be as follows:

$$\underline{\underline{G}} = \begin{bmatrix} \frac{1}{1+j\omega\tau_x} & 0 \\ 0 & \frac{1}{1+j\omega\tau_y} \end{bmatrix}$$

with $\tau_x = 20$ ms $\tau_y = 45$ ms

The following, then, applies to the m-matrix of the compensator:

$$\underline{\underline{G}}_m^+ = \begin{bmatrix} 1+jm\nu\tau_x 2\pi/L & 0 \\ 0 & 1+jm\nu\tau_y 2\pi n/L \end{bmatrix}$$

whereby "v" is the desired course speed and "L" is the length of the course. The example of application shown in FIG. 3 demonstrates that a substantial effect of compensation was achieved even with a very simple dynamical model.

While only a single embodiment of the present invention has been shown and described, it will be obvious that many changes and modifications may be made thereunto without departing from the spirit and scope of the invention.

What is claimed is:

1. A process for the memory-saving programming of robot movements and for compensating dynamical errors of motion during the execution of robot movements, comprising the steps of:
   (a) recording and storing a reference course in the form of samples ($\underline{x}_k$ for K=0, 1, 2 ... up to K−1);
   (b) transforming said samples by a Fourier analysis into a Fourier matrix ($_0\underline{\underline{C}}=(c_{n,m})$ for n=1 to N (with N=3 for a curve in space) and m=0, 1, 2, ... M), so as to reduce the storage space;
   (c) filing the resulting Fourier matrix ($_0\underline{\underline{C}}$) in a memory;
   (d) deriving Fourier matrices from the Fourier matrix ($_0\underline{\underline{C}}$) for courses having the same configuration, but any desired position and orientation, in the form of a Fourier matrix ($_1\underline{\underline{C}}$) by linear transformation of the coordinates;
   (e) modifying the Fourier matrix ($_1\underline{\underline{C}}$) with speed adjustment by utilization of the dynamical model ($\underline{\underline{G}}(\omega)$) of the robot to a Fourier matrix ($\underline{\underline{C}}$), so as to compensate for the dynamical errors of motion of the robot; and
   (f) subjecting the Fourier matrix ($\underline{\underline{C}}$) to a Fourier synthesis with predetermination of an arc length (s) conforming to the desired course speed (v) so as to create the coordinates of the course.

2. A system for the storage space-saving programming of robot movements and for compensating dynamical errors of motion during the execution of robot movements, said system comprising:
   (a) a recording and storing means for recording and storing a reference course in the form of samples ($\underline{x}_k$ for K=0, 1, 2 ... up to K−1);
   (b) a first Fourier transformer for subjecting said samples to an analysis and transforming said scan values into a Fourier matrix ($_0\underline{\underline{C}}=(c_{n,m})$ for n=1 to N (with N=3 for a curve in space) and m=0, 1, 2, ... M), for reducing the storage space thereof;
   (c) memory means for filing the resulting Fourier matrix ($_0\underline{\underline{C}}$);
   (d) a coordinate transformer means for deriving, by linear transformaion of the coordinates, Fourier matrices from the Fourier matrix ($_0\underline{\underline{C}}$) for courses having the same configuration, but any desired position and orientation, in the form of a Fourier matrix ($_1\underline{\underline{C}}$);
   (e) a dynamics compensator means for modifying the Fourier matrix ($_1\underline{\underline{C}}$) with speed adjustment by utilization of the dynamical model ($\underline{\underline{G}}(\omega)$) of the robot to a Fourier matrix ($\underline{\underline{C}}$), so as to compensate for the dynamical errors of motion of the robot; and
   (f) a second Fourier transformer for subjecting the Fourier matrix ($\underline{\underline{C}}$) to a Fourier synthesis with predetermination of an arc length (s) conforming to the desired course speed (v) for creating the coordinates of the course.

* * * * *